United States Patent
Qiu (10) Patent No.: US 12,513,413 B2
(45) Date of Patent: Dec. 30, 2025

(54) SHOOTING METHOD AND APPARATUS, AND ELECTRONIC DEVICE

(71) Applicant: VIVO MOBILE COMMUNICATION CO., LTD., Dongguan (CN)

(72) Inventor: Jing Qiu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 399 days.

(21) Appl. No.: 18/136,325

(22) Filed: Apr. 18, 2023

(65) Prior Publication Data

US 2023/0345133 A1    Oct. 26, 2023

Related U.S. Application Data

(63) Continuation of application No. PCT/CN2021/125367, filed on Oct. 21, 2021.

(30) Foreign Application Priority Data

Oct. 21, 2020    (CN) .......................... 202011135834.5

(51) Int. Cl.
*H04N 23/76* (2023.01)
*G06T 7/70* (2017.01)
(Continued)

(52) U.S. Cl.
CPC ............... *H04N 23/76* (2023.01); *G06T 7/70* (2017.01); *G06V 20/10* (2022.01); *H04N 5/272* (2013.01);
(Continued)

(58) Field of Classification Search
CPC ........ H04N 23/76; H04N 5/272; H04N 23/62; H04N 23/695; H04N 23/61;
(Continued)

(56) References Cited

U.S. PATENT DOCUMENTS

2007/0283583 A1* 12/2007 Subbiondo ............. G09B 27/04
                                                           340/815.4
2015/0377999 A1    12/2015 Shen et al.
2017/0374254 A1    12/2017 Miyazaki

FOREIGN PATENT DOCUMENTS

CN    103905730 A    7/2014
CN    104079835 A    10/2014
(Continued)

OTHER PUBLICATIONS

International Search Report issued in corresponding International Application No. PCT/CN2021/125367, mailed Jan. 19, 2022, 5 pages.
(Continued)

*Primary Examiner* — Stephen P Coleman
(74) *Attorney, Agent, or Firm* — IPX PLLC (57) ABSTRACT

A shooting method and apparatus and an electronic device are provided. The shooting method includes: acquiring a first starry sky image; determining a first planet in the first starry sky image according to a geographical location of the electronic device or recognition of the first starry sky image; acquiring a magnitude brightness corresponding to the first planet; and adjusting a brightness of the first planet in the first starry sky image according to a target time and the magnitude brightness, where the target time is a time at which the first starry sky image is acquired.

15 Claims, 3 Drawing Sheets

(51) Int. Cl.
*G06V 20/10* (2022.01)
*H04N 5/272* (2006.01)
*H04N 23/62* (2023.01)
*H04N 23/695* (2023.01)

(52) U.S. Cl.
CPC ........... *H04N 23/62* (2023.01); *H04N 23/695* (2023.01); *G06T 2207/10032* (2013.01); *G06T 2207/20212* (2013.01)

(58) Field of Classification Search
CPC .... H04N 23/6845; H04N 23/70; H04N 23/60; H04N 23/64; H04N 23/71; G06T 7/70; G06T 2207/10032; G06T 2207/20212; G06V 20/10; Y02D 30/70
USPC .......................................................... 382/274
See application file for complete search history.

(56) References Cited

FOREIGN PATENT DOCUMENTS

| | | |
|---|---|---|
| CN | 104113693 A | 10/2014 |
| CN | 106506858 A | 3/2017 |
| CN | 107613219 A | 1/2018 |
| CN | 110930329 A | 3/2020 |
| CN | 110995993 A | 4/2020 |
| CN | 112261294 A | 1/2021 |
| JP | 2016081466 A | 5/2016 |
| WO | 2018149321 A1 | 8/2018 |

OTHER PUBLICATIONS

First Office Action issued in related Chinese Application No. 202011135834.5, mailed Aug. 2, 2021, 9 pages.
Second Office Action issued in related Chinese Application No. 202011135834.5, mailed Mar. 14, 2022, 6 pages.
Extended European Search Report issued in related European Application No. 21882111.4, mailed Feb. 22, 2024, 6 pages.
Office Action issued in related European Application No. 21882111.4, mailed Jun. 26, 2025, 6 pages.
Norman Ian E: "Pentax K-1 Mark II Astrophotography Review", Jun. 11, 2018, XP093288417, Retrieved from the Internet: URL:https://www.lonelyspeck.com/pentax-k-1-mark-ii-astrophotography.review/.

* cited by examiner

SHOOTING METHOD AND APPARATUS, AND ELECTRONIC DEVICE

CROSS-REFERENCE TO RELATED APPLICATIONS

This application is a continuation of International Application No. PCT/CN2021/125367, filed Oct. 21, 2021, which claims priority to Chinese Patent Application No. 202011135834.5, filed Oct. 21, 2020. The entire contents of each of the above-referenced applications are expressly incorporated herein by reference.

TECHNICAL FIELD

This application pertains to the field of shooting technologies, and specifically relates to a star shooting method and apparatus, and an electronic device.

BACKGROUND

Currently, with the popularization of shooting electronic devices, vast and bright stars gradually become objects that photographers compete to perform shooting.

However, because a starry sky image is wide, a professional photographer is generally required to acquire a clear starry sky image by using a professional device. The foregoing shooting requires a long time, heavy devices, and a complex operation, but it is difficult for a common device to acquire a clear and bright starry sky image of a planet.

SUMMARY

Embodiments of this application provide a shooting method.

According to a first aspect, an embodiment of this application provides a shooting generation method applied to an electronic device, and the method includes:
acquiring a first starry sky image;
determining a first planet in the first starry sky image according to a geographical location of the electronic device and/or recognition of the first starry sky image;
acquiring magnitude brightness corresponding to the first planet; and
adjusting brightness of the first planet in the first starry sky image according to the target time and the magnitude brightness; where
the target time is time at which the first starry sky image is acquired.

According to a second aspect, an embodiment of this application provides a shooting apparatus, and the apparatus includes:
a first acquiring module, configured to acquire a first starry sky image;
a first determining module, configured to determine a first planet in the first starry sky image according to a geographical location of the electronic device and/or recognition of the first starry sky image;
a second acquiring module, configured to acquire magnitude brightness corresponding to the first planet; and
an adjustment module, configured to adjust brightness of the first planet in the first starry sky image according to the target time and the magnitude brightness; where
the target time is time at which the first starry sky image is acquired.

According to a third aspect, an embodiment of this application provides an electronic device. The electronic device includes a processor, a memory, and a program or an instruction that is stored in the memory and that can run on the processor, and when the program or the instruction is executed by the processor, steps in the shooting method described in the first aspect are implemented.

According to a fourth aspect, an embodiment of this application provides a readable storage medium, where the readable storage medium stores a program or an instruction, and when the program or the instruction is executed by the processor, steps in the shooting method described in the first aspect are implemented.

According to a fifth aspect, an embodiment of this application provides a chip. The chip includes a processor and a communication interface, the communication interface is coupled to the processor, and the processor is configured to run a program or an instruction to implement the shooting method described in the first aspect.

BRIEF DESCRIPTION OF DRAWINGS

To describe the technical solutions of the embodiments of this application more clearly, the following briefly describes the accompanying drawings for describing the embodiments of this application. Apparently, the accompanying drawings in the following descriptions show merely some embodiments of this application, and a person of ordinary skill in the art may still derive other accompanying drawings from these accompanying drawings without creative efforts.

DETAILED DESCRIPTION

To make the objectives, technical solutions, and technical effects of this application clearer, the following describes this application in detail with reference to specific embodiments. It should be understood that the embodiments described in this specification are merely intended to explain this application, and are not intended to limit this application.

Terms "first" and "second" in the specification and claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and the character "/" generally represents an "or" relationship between associated objects.

With reference to the accompanying drawings, a shooting provided in embodiments of this application is described in detail below by using a specific embodiment and an application scenario thereof.

Figure 1:
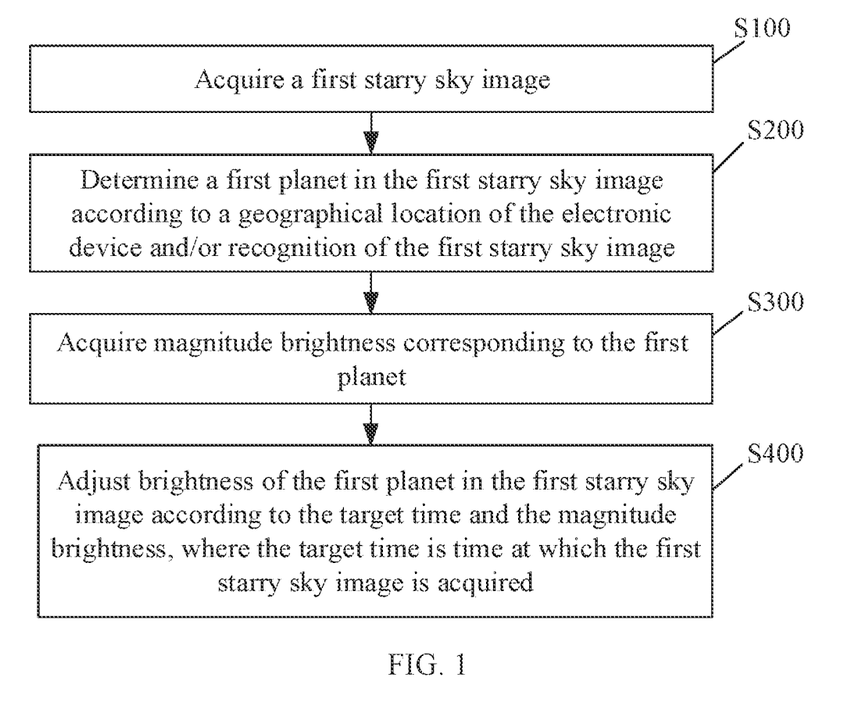
FIG. 1 is a step flowchart of a shooting method according to this application.

FIG. 1 is a step flowchart of a shooting method according to an embodiment of this application. The method may include steps S100 to S500.

In this embodiment of this application, the shooting method is applied to an electronic device that has a display screen and a camera, such as a mobile phone, a tablet computer, or a camera.

Step S100: Acquire a first starry sky image.

In step S100, the first starry sky image is a starry sky image acquired by a camera of the electronic device. In actual application, the first starry sky image may be a preview image formed after a to-be-shot star area enters a field of view of the camera in a case that the camera is enabled.

Step S200: Determine a first planet in the first starry sky image according to a geographical location of the electronic device and/or recognition of the first starry sky image.

In step S200, to subsequently adjust the brightness of each planet in a shot image according to magnitude brightness, a first planet included in a to-be-shot star region need to be determined.

Because different star regions can be viewed at different locations on the earth, when the electronic device shoots an image, the geographical location of the electronic device can be recorded, and then each first planet in the shot starry sky image can be found and determined according to the recorded geographical location. In some embodiments, at a same location on the earth, star regions shot by the camera at different shooting angles are also different. Therefore, when the electronic device shoots a starry sky image, a current location of the electronic device and a current shooting angle may be determined by means of positioning, and then each planet included in the first starry sky image acquired through shooting is determined according to the current location and the current shooting angle.

In addition, because image content presented by starry sky images of different star regions acquired by the electronic device on the earth is different, the first starry sky image acquired in a shooting manner may be recognized, and a star region corresponding to the first starry sky image is determined, to determine each first planet in the first starry sky image.

In an implementation, the first planet in the first starry sky image is determined according to the geographical location of the electronic device and recognition of the first starry sky image. In this implementation, a star region range to which the acquired first starry sky image approximately belongs is first determined by using the geographical location, and then the first starry sky image is recognized, and a first star region corresponding to the first starry sky image is found from the foregoing star region range, so that each first planet in the first starry sky image can be quickly determined, thereby reducing an amount of retrieved data.

Step S300: Acquire magnitude brightness corresponding to the first planet.

In step S300, magnitude represents brightness of a planet, that is, a brightness level of the planet, and magnitude of each planet is generally fixed. A smaller magnitude indicates a brighter planet. When the magnitude differs by 1, brightness approximately differs by 2.512 times. Therefore, brightness of a magnitude 1 is exactly 100 times brightness of a magnitude 6.

After each first planet in the first starry sky image is determined by using step S200, a magnitude database is searched to acquire a magnitude of each first planet, to determine magnitude brightness corresponding to each first planet.

In some embodiments, when the magnitude differs by one star, brightness approximately differs by 2.512 times, and brightness of the sun is $L=3.8 \times 10^{33}$ erg·$s^{-1}$, and a magnitude of the sun is −26.7. Therefore, after determining the magnitude of the first planet, magnitude brightness of a fixed star may be acquired by comparing the brightness and the magnitude of the sun, so that visual performance of optical brightness of the first planet may be simulated.

Step S400: Adjust brightness of the first planet in the first starry sky image according to the target time and the magnitude brightness, where the target time is time at which the first starry sky image is acquired.

In step S400, because the magnitude brightness of the planet is a fixed value, and actual brightness presented by the planet at different times is different, display brightness of the first planet in a shot image may be simulated by using a synthesis algorithm after the magnitude brightness of the first planet is calculated. The display brightness shows real brightness of the first planet when the first starry sky image is acquired, and corresponding brightness of the first planet is rendered according to the display brightness, so that real brightness of the first planet is clearly presented on the first starry sky image. Brightness of each first planet in the first starry sky image is visual performance of true brightness of the first starry sky image, the first starry sky image can have a real and clear planet visual effect.

In the shooting method provided in this embodiment of this application, when a first starry sky image is acquired, a first planet in the first starry sky image is determined according to a geographical location of an electronic device and/or recognition of the first starry sky image; and then, magnitude brightness corresponding to the first planet is acquired; and then, brightness of the first planet in the first starry sky image is adjusted according to target time at which the first starry sky image is acquired and the magnitude brightness. In the foregoing shooting manner, the electronic device automatically adjusts, according to acquired magnitude brightness of each first planet in shot stars and shooting time, brightness of each first planet in the acquired first starry sky image, to simulate brightness visual performance of each planet, so that brightness of each planet in the shot starry sky image can be real, clear, and delicate.

In an implementation, according to the shooting method provided in this embodiment of the present application, the electronic device includes a micro gimbal and a camera, the camera is disposed on the micro gimbal, and before step S100, step S101 is further included, and step S100 includes steps S111 and S112.

In this implementation, the camera of the electronic device for performing star shooting is disposed on the micro gimbal, that is, the camera is a micro gimbal camera. The micro gimbal is disposed on a main body of the electronic device, and may perform physical multi-axis rotation relative to the main body of the electronic device, to drive the camera to rotate. The micro gimbal is connected to a processor of the electronic device, and may receive and execute a rotation instruction delivered by the processor.

Step S101: Acquire a target rotation angle according to target duration, where the target rotation angle is an angle of rotation of the earth within the target duration, and the target duration is duration from receiving of a shooting input by the electronic device to imaging.

In step S101, when shooting stars, the camera cannot focus each location of a to-be-shot star region through single shooting. Therefore, multiple shots are performed by pressing a shutter for a single time, and in each time of shooting, different locations of the to-be-shot star region are focused, so that focusing of the to-be-shot star region is implemented. Subsequently, images acquired by means of multiple times of focusing imaging are synthesized, to acquire a clear image of the foregoing star region. In a process of perform shooting multiple times, a time interval between two adjacent times of shooting is the target duration. In actual application, the target duration may be acquired by automatically triggering calculation by the shooting electronic device after each time of focusing, or may be preset according to shooting performance such as focusing of the camera, or may be preset and adjusted by the user according to a shooting scenario.

Because rotation of the earth causes displacement of the electronic device relative to a to-be-shot planet, in a process in which the electronic device is relatively fixed to the earth, and the camera continuously performs shooting for multiple times at a fixed angle, a direction of each time of shooting of the to-be-shot planet is different, and consequently, locations of the to-be-shot planet are different in images acquired by continuously shooting for multiple times. In the target duration, an angle change value formed in a shooting direction of the displacement of the to-be-shot planet is generated by the electronic device due to rotation of the earth, and a shooting angle difference may be determined. Then, a rotation angle of the micro gimbal is determined according to the shooting angle difference, that is, the target rotation angle is in a reverse direction with the shooting angle difference, and if the shooting angle difference is shifted left by 0.01°, the first rotation angle is shifted right by 0.01°.

In the target duration, the rotation of the earth drives the electronic device to generate the first displacement of the to-be-shot planet, which may be acquired by means of calculation by using the rotation of the earth. In other words, the displacement of the electronic device relative to the to-be-shot planet in the target duration may be acquired, so that an angle change value formed by the foregoing displacement in a shooting direction may be calculated, and then the target rotation angle is determined.

Step S111: Receive a first input of a user.

In step S111, the first input is an input in which the user determines to perform single starry sky image shooting, and may be a selection operation for a starry sky image shooting button.

Step S112: In response to the first input, rotate the micro gimbal according to the target rotation angle and acquire the first starry sky image.

In step S112, in a case that the first input of the user is received, after the target duration is reached, the micro gimbal rotates by the target rotation angle, and then controls the camera to shoot a first image, to compensate for the angle change value formed in the shooting direction due to displacement of the electronic device relative to the shot planet in the target duration, so that angles of the shot planet are the same in two times before and after the target duration, and locations of the shot planet in the first images acquired for multiple consecutive times are consistent.

In step S112, after the multiple first images are continuously acquired by shooting, the multiple first images are aligned and synthesized into one target image, to acquire the first starry sky image. Because locations of the to-be-shot planet are the same in the first images acquired by shooting for multiple consecutive times, when the multiple first images are subsequently aligned and synthesized into one target image, each first planet images shot are not ambiguous due to displacement.

In actual application, when the electronic device has displacement relative to the to-be-shot planet, a radial velocity of the to-be-shot planet observed by the electronic device changes. After the first input of the user is received and the target duration is reached, the micro gimbal is controlled to rotate the target rotation angle, and then the camera is controlled to shoot one first image. This is equivalent to compensating for a change in the radial velocity caused by the displacement of the electronic device relative to the to-be-shot planet in the target duration, so that in a process in which the electronic device performs displacement relative to the to-be-shot planet, the radial velocity of the to-be-shot planet observed by the electronic device is same.

In the foregoing implementation, by controlling the rotation angle of the micro gimbal to compensate for the angle change value formed in the shooting direction of the displacement of the electronic device relative to the to-be-shot planet in the target duration, locations of the to-be-shot planet are consistent in the first images acquired by shooting for multiple consecutive times, and shot first planet images are not ambiguous due to the displacement.

In an implementation, the shooting method provided in this embodiment of the present application further includes step S102 before step S100, and step S100 includes steps S113 and S114.

Step S102: Acquire N starry sky images, where backgrounds of the N starry sky images are the same, and the N starry sky images are acquired by performing shooting at an interval of preset time.

In step S102, after the first input of the user is received, after the preset time reaches, the micro gimbal is controlled to rotate the first rotation angle, and then the camera is controlled to shoot one starry sky image, and then a same background of the starry sky image is kept the same, and after continuing for the preset time, the micro gimbal is rotated by the first rotation angle and shoot another one starry sky image is shot until the N starry sky images that can present a star orbit effect are shot, and subsequently the N starry sky images are synthesized into one target image, so that the target image can present a star orbit effect with clear planets.

In a process of acquiring the N starry sky images, the preset time and the first rotation angle are acquired, and the first rotation angle is an angle change value required in a shooting direction by two adjacent starry sky images in the N starry sky images that present a star orbit effect of a planet location change. Then, the micro gimbal is controlled to rotate according to the preset time and the first rotation angle, and each time after the micro gimbal stop rotating, the camera is controlled to shoot one starry sky image, to continuously perform shooting at an interval of preset time until the N starry sky images are acquired.

The preset time is a shooting time interval between two adjacent starry sky images in the N starry sky images, and the preset time and the first rotation angle may be preset according to shooting performance of the camera, or may be preset and adjusted by the user according to a shooting scenario.

Step S113: Acquire a planet image of each starry sky image in the N starry sky images and coordinate information of each planet image in a corresponding starry sky image, to acquire N planet images and corresponding N pieces of coordinate information.

In step S113, the N starry sky images are recognized to acquire a planet image in each starry sky image and corresponding coordinate information, to subsequently synthesize a star orbit image that presents a motion track effect of the planet.

Step S114: Synthesize the corresponding N planet images into a target background to acquire the first starry sky image according to the N pieces of coordinate information, where the target background is a background of a target starry sky image in the N starry sky images.

In step S114, the target background is a common background of the N starry sky images. Because the backgrounds of the N starry sky images are the same, and each starry sky image is shot from a shooting angle in which a change in a location of the planet is presented, the corresponding N planet images are synthesized into a same background according to N pieces of coordinate information of the N starry sky images, that is, a first starry sky image that presents a motion track effect of the planet may be acquired.

In the foregoing implementation, the camera is automatically controlled, by using the micro gimbal, to rotate to shoot the N starry sky images that present the star orbit effect, and then the N starry sky images are processed and synthesized into a panoramic star orbit photo, and a shooting process is simple and fast, and a star picture acquired through shooting is clear and bright.

In an implementation, in a star-orbit shooting process, after the first input of the user is received, P second images shot after the preset time is reached and the micro gimbal is controlled to rotate by the first rotation angle are aligned and synthesized. In a process of shooting the P second images, the following is included: acquiring target duration, and determining a shooting angle difference according to the target duration, where the shooting angle difference is an angle change value formed by displacement of the electronic device relative to the to-be-shot planet in the shooting direction within the target duration; determining a target rotation angle of the micro gimbal according to the shooting angle difference; and controlling the micro gimbal to rotate according to the target duration and the target rotation angle, and each time after the micro gimbal stops rotating, controlling the camera to shoot a second image until P second images are acquired by shooting.

In the foregoing specific implementation, each starry sky image in a star orbit shooting process is acquired by synthesizing P second images that are shot after a shooting angle is slightly corrected by using the micro gimbal, so that each starry sky image can focus on a shot star region, and a case that each first planet image in a finally shot star orbit image has shadows and is blurred due to a displacement does not appear.

In an implementation, in the shooting method provided in this embodiment of the present application, there are M first starry sky images, focuses of the M starry sky images are the same, and the M starry sky images are shot by the electronic device after moving a preset distance at intervals. After step S400, step S500 is further included.

Step S500: Play the M starry sky images in a preset sequence within a preset duration, where the preset sequence is a sequence of starry sky images shot by the electronic device after moving a preset distance.

This implementation corresponds to an application scenario of star time-lapse shooting. In this implementation, a focus, that is, a reference point, of star time-lapse shooting needs to be first determined according to a selection operation of the user, and then the focus is aligned when multiple images in the star time-lapse shooting are performed, so that the focus is always at a fixed location of a shot image. In actual application, the reference point may be a planet in a to-be-shot star region.

After the focus is determined, the electronic device is moved at equal distances to different M locations, to acquire the M starry sky images through shooting. Each of the starry sky images is acquired by controlling the camera to shoot the star region after the electronic device moves to a target location and the micro gimbal is adjusted to align a shot picture horizontally with the reference point.

Because when observed from the earth, a planet in the starry sky moves slowly, it is difficult to present, in a short time, a subtle change of a macro picture in a normal star shooting manner. In the foregoing step, after star time-lapse shooting is enabled, the electronic device is sequentially moved to M different locations at equal distances, and at one location, the micro gimbal is controlled to rotate, so that a shot picture horizontally aligns with a predetermined reference point, and then focused shooting is performed, so that one starry sky image may be acquired at each location, and M starry sky images may be acquired in total. Moving at equal distances may ensure the smoothness of a picture. Subsequently, the M starry sky images are synthesized into a processed video to acquire achieve star time-lapse shooting.

In the foregoing process, the electronic device moves at equal distances, and shooting is performed by horizontally aligning the shooting picture with the predetermined reference point by using the micro gimbal, which is equivalent to constructing an illusion in which movement of the electronic device replaces movement of the planet and the planet moves quickly and smoothly, so that enough dynamic effects presenting star transformation can be shot in a short time, that is, the foregoing star time-lapse shooting is achieved.

In a process of controlling the electronic device to move to the M different locations at equal distances, a moving interval needs to be determined with reference to a size of a scenario and a length of a final video. For example, Interval=Total distance/Number of video frames, and Number of video frames=Frame rate*Time.

In an implementation, each starry sky image is acquired by aligning and synthesizing Q third images at a first location corresponding to the M different locations. The Q third images are acquired by the electronic device by performing shooting after moving to the first location. Steps of shooting the Q third images include: acquiring target duration, and determining a shooting angle difference according to the target duration.

The shooting angle difference is an angle change value formed by displacement of the electronic device relative to the to-be-shot planet in a shooting direction. A target rotation angle of the micro gimbal is determined according to the shooting angle difference, and the micro gimbal is controlled to rotate according to the target duration and the target rotation angle, and each time after the micro gimbal stops rotating, the camera is controlled to shoot a third image until Q third images are acquired.

In the foregoing specific implementation, starry sky images at all the shot locations in the star time-lapse shooting process are acquired by synthesizing the Q third images acquired after the micro gimbal is adjusted by the shooting angle, so that each starry sky image can focus on a shot star region, and therefore the shot image is clearer.

In an implementation, the shooting method provided in this embodiment of the present application further includes steps S601 and S602 after step S100.

Step S601: Receive a second input for the first planet.

In step S601, the second input is a selection input of the user for a location corresponding to the first planet in the first starry sky image, and may be a touch, tap, or focus operation on a screen area in which the first planet in the first starry sky image is located.

Step S602: Display, in response to the second input, planet information corresponding to the first planet.

In step S600, when the second input is received, it indicates that the user wants to learn related information of the first planet, and therefore, planet information corresponding to the first planet is displayed on a shooting interface. By locating longitude and latitude of the electronic device, it may be determined which planets can be viewed by the user at a current location. With reference to the shooting angle of the electronic device, specific distribution of first planets in a star region that the camera faces may be determined. Therefore, planet information corresponding to each first planet may be displayed on the shooting interface, so that the user can learn planets in stars that are shot by the user.

In an implementation, the planet information includes a star map, and first planets in a constellation are connected to present a constellation shape, so that the user recognizes an important constellation and planet. In addition, an AR image with an artistic effect displayed behind a constellation in the center of a shooting interface may be set, so that the user better recognizes the constellation.

In an implementation, the planet information further includes a type of the planet, a distance from the earth, a magnitude, current coordinates in the sky, and the like. The information may be presented when the user taps the target first planet after the user enables a star map knowledge pattern, so that corresponding planet information can be more comprehensively propagated to the user.

In an implementation, a shooting direction may be displayed on the shooting interface, to make it convenient for the user to search for a required shooting direction, so as to fasten to shoot a fleeting starlight scene such as meteor shower in advance.

It should be noted that the shooting method provided in this embodiment of this application may be performed by a terminal device or a control module that is in the terminal device and that is configured to perform the shooting method. In this embodiment of this application, the shooting method provided in this embodiment of this application is described an example in which the terminal device performs and loads the shooting method.

Figure 2:
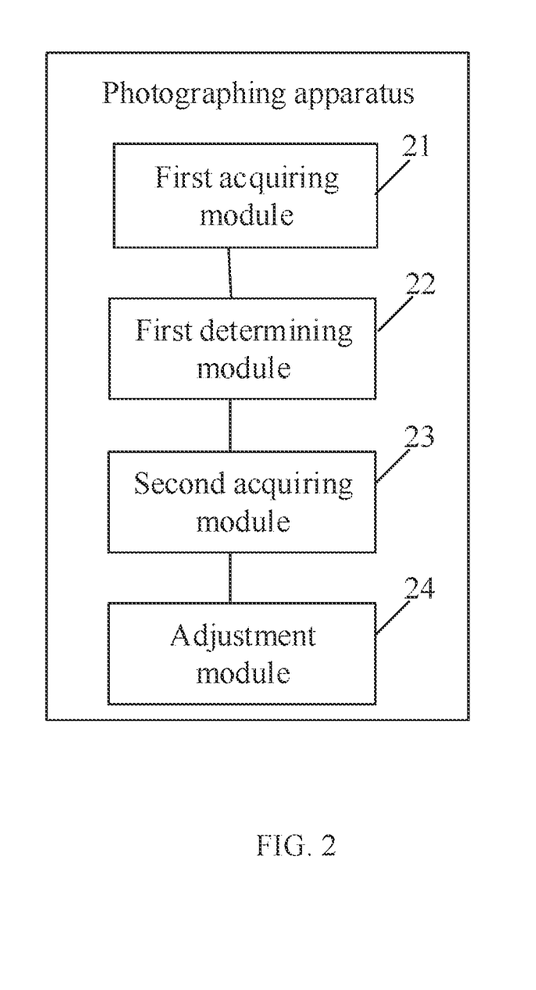
FIG. 2 is a schematic diagram of a structure of a shooting apparatus according to this application.

FIG. 2 is a schematic diagram of a structure of a shooting apparatus according to an embodiment of this application. The apparatus is applied to an electronic device. As shown in FIG. 2, the apparatus includes:
a first acquiring module 21, configured to acquire a first starry sky image;
a first determining module 22, configured to determine a first planet in the first starry sky image according to a geographical location of the electronic device and/or recognition of the first starry sky image;
a second acquiring module 23, configured to acquire magnitude brightness corresponding to the first planet; and
an adjustment module 24, configured to adjust brightness of the first planet in the first starry sky image according to the target time and the magnitude brightness; where the target time is time at which the first starry sky image is acquired.

Because the magnitude brightness of the planet is a fixed value, and actual brightness presented by the planet at different times is different, display brightness of the first planet in a shot image may be simulated by using a synthesis algorithm after the magnitude brightness of the first planet is calculated. The display brightness shows real brightness of the first planet when the first starry sky image is acquired, and corresponding brightness of the first planet is rendered according to the display brightness, so that real brightness of the first planet is clearly presented on the first starry sky image. Brightness of each first planet in the first starry sky image is visual performance of true brightness of the first starry sky image, the first starry sky image can have a real and clear planet visual effect.

In this embodiment of this application, when a first starry sky image is acquired, a first planet in the first starry sky image is determined according to a geographical location of an electronic device and/or recognition of the first starry sky image; and then, magnitude brightness corresponding to the first planet is acquired; and then, brightness of the first planet in the first starry sky image is adjusted according to target time at which the first starry sky image is acquired and the magnitude brightness. In the foregoing shooting manner, the electronic device automatically adjusts, according to acquired magnitude brightness of each first planet in shot stars and shooting time, brightness of each first planet in the acquired first starry sky image, to simulate brightness visual performance of each planet, so that brightness of each planet in the shot starry sky image can be real, clear, and delicate.

In an implementation, the electronic device includes a micro gimbal and a camera, the camera is disposed on the micro gimbal, and the apparatus further includes:
a third acquiring module, configured to: acquire a target rotation angle according to target duration before the first starry sky image is acquired, where the target rotation angle is an angle of rotation of the earth within the target duration, and the target duration is duration from receiving of a shooting input by the electronic device to imaging.

The first acquiring module 21 includes:
a receiving unit, configured to receive a first input of a user; and
a shooting unit, configured to: in response to the first input, rotate the micro gimbal according to the target rotation angle and acquire the first starry sky image.

In actual application, when the electronic device has displacement relative to the to-be-shot planet, a radial velocity of the to-be-shot planet observed by the electronic device changes. After the first input of the user is received, after the target duration is reached, the micro gimbal is controlled to rotate by the target rotation angle, and then the camera is controlled to shoot one first image. This is equivalent to compensating for a change in the radial velocity caused by the displacement of the electronic device relative to the to-be-shot planet in the target duration, so that in a process in which the electronic device performs displacement relative to the to-be-shot planet, the radial velocity of the to-be-shot planet observed by the electronic device is the same.

In this embodiment of this application, by controlling the rotation angle of the micro gimbal to compensate for the angle change value formed in the shooting direction of the displacement of the electronic device relative to the to-be-shot planet in the target duration, locations of the to-be-shot planet are consistent in the first images acquired by shooting for multiple consecutive times, and shot first planet images are not ambiguous due to the displacement.

In an implementation, the apparatus further includes:
a fourth acquiring module, configured to: before the first starry sky image is acquired, acquire N starry sky images, where backgrounds of the N starry sky images are the same, and the N starry sky images are acquired by performing shooting at an interval of preset time.

The first acquiring module 21 includes:
an acquiring unit, configured to acquire a planet image of each starry sky image in the N starry sky images and coordinate information of each planet image in a corresponding starry sky image, to acquire N planet images and corresponding N pieces of coordinate information; and a synthesizing unit, configured to synthesize the corresponding N planet images into a target background to acquire the first starry sky image according to the N pieces of coordinate information, where the target background is a background of a target starry sky image in the N starry sky images.

The target background is a common background of the N starry sky images. Because the backgrounds of the N starry sky images are the same, and each starry sky image is shot from a shooting angle in which a change in a location of the planet is presented, the corresponding N planet images are synthesized into a same background according to N pieces of coordinate information of the N starry sky images, that is, a first starry sky image that presents a motion track effect of the planet may be acquired.

In this embodiment of this application, the camera may be automatically controlled, by using the micro gimbal, to rotate to shoot the N starry sky images that present the star orbit effect, and then the N starry sky images are processed and synthesized into a panoramic star orbit photo under the stars, and a shooting process is simple and fast, and a star picture acquired through shooting is clear and bright.

In an implementation, there are M first starry sky images, focuses of the M starry sky images are the same, and the M starry sky images are images shot by the electronic device after moving a preset distance at intervals. The apparatus further includes:

a playing module, configured to: after the brightness of the first planet in the first starry sky image is adjusted according to the target time and the magnitude brightness, play the M starry sky images in a preset sequence within preset duration, where the preset sequence is a sequence of starry sky images shot by the electronic device after moving a preset distance.

Because when observed from the earth, a planet in the stars moves slowly, it is difficult to present, in a short time, a subtle change of a macro picture in a normal star shooting manner. After star time-lapse shooting is enabled, the electronic device is sequentially moved to M different locations at equal distances, and at one location, the micro gimbal is controlled to rotate, so that a shot picture horizontally aligns with a predetermined reference point, and then focused shooting is performed, so that one starry sky image may be acquired at each location, and M starry sky images may be acquired in total. Moving at equal distances may ensure smoothness of a picture. Subsequently, the M starry sky images are synthesized into a processed video to acquire achieve star time-lapse shooting.

In the foregoing process, the electronic device moves at equal distances, and shooting is performed by horizontally aligning the shooting picture with the predetermined reference point by using the micro gimbal, which is equivalent to constructing an illusion in which movement of the electronic device replaces movement of the planet and the planet moves quickly and smoothly, so that enough dynamic effects presenting star transformation can be shot in a short time, that is, the foregoing star time-lapse shooting is achieved.

In an implementation, the apparatus further includes:

a receiving module, configured to: after the first planet in the first starry sky image is determined according to a geographical location of the electronic device and/or recognition of the first starry sky image, receive a second input for the first planet; and a displaying module, configured to: in response to the second input, display planet information corresponding to the first planet.

When the second input is received, it indicates that the user wants to learn related information of the first planet, and therefore, planet information corresponding to the first planet is displayed on a shooting interface. By locating longitude and latitude of the electronic device, it may be determined which planets can be viewed by the user at a current location. With reference to the shooting angle of the electronic device, specific distribution of first planets in a star region that the camera faces may be determined. Therefore, planet information corresponding to each first planet may be displayed on the shooting interface, so that the user can learn planets included in stars that are shot by the user.

The shooting apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (UMPC), a netbook, or a personal digital assistant (PDA), and the non-mobile electronic device may be a server, a network attached storage (NAS), a personal computer (PC), a television (TV), a counter, or a self-service machine. This is not specifically limited in this embodiment of this application.

The shooting apparatus in this embodiment of this application may be an apparatus with an operating system. The operating system may be an Android operating system, may be an iOS operating system, or may be another possible operating system. This is not limited in this embodiment of this application.

The shooting apparatus provided in this embodiment of this application can implement processes implemented by the shooting apparatus in the method embodiment of FIG. 1. To avoid repetition, details are not described herein again.

In this embodiment of this application, when the first acquiring module 21 acquires the first starry sky image, the first determining module 22 determines the first planet in the first starry sky image according to the geographical location of the electronic device and/or recognition of the first starry sky image. Then, the second acquiring module 23 acquires the magnitude brightness corresponding to the first planet. Then, the adjustment module 24 adjusts the brightness of the first planet in the first starry sky image according to the target time at which the first starry sky image is acquired and the magnitude brightness. In the foregoing shooting manner, the electronic device automatically adjusts, according to acquired magnitude brightness of each first planet in shot stars and shooting time, brightness of each first planet in the acquired first starry sky image, to simulate brightness visual performance of each planet, so that brightness of each planet in the shot starry sky image can be real, clear, and delicate.

An embodiment of this application further provides an electronic device, including a processor, a memory, and a program or an instruction that is stored in the memory and that can run on the processor. When the program or the instruction is executed by the processor, processes of the embodiment of the shooting method can be implemented, and a same technical effect can be achieved. To avoid repetition, details are not described herein.

It should be noted that the electronic device in this embodiment of this application includes the foregoing mobile electronic device and the foregoing non-mobile electronic device.

Figure 3:
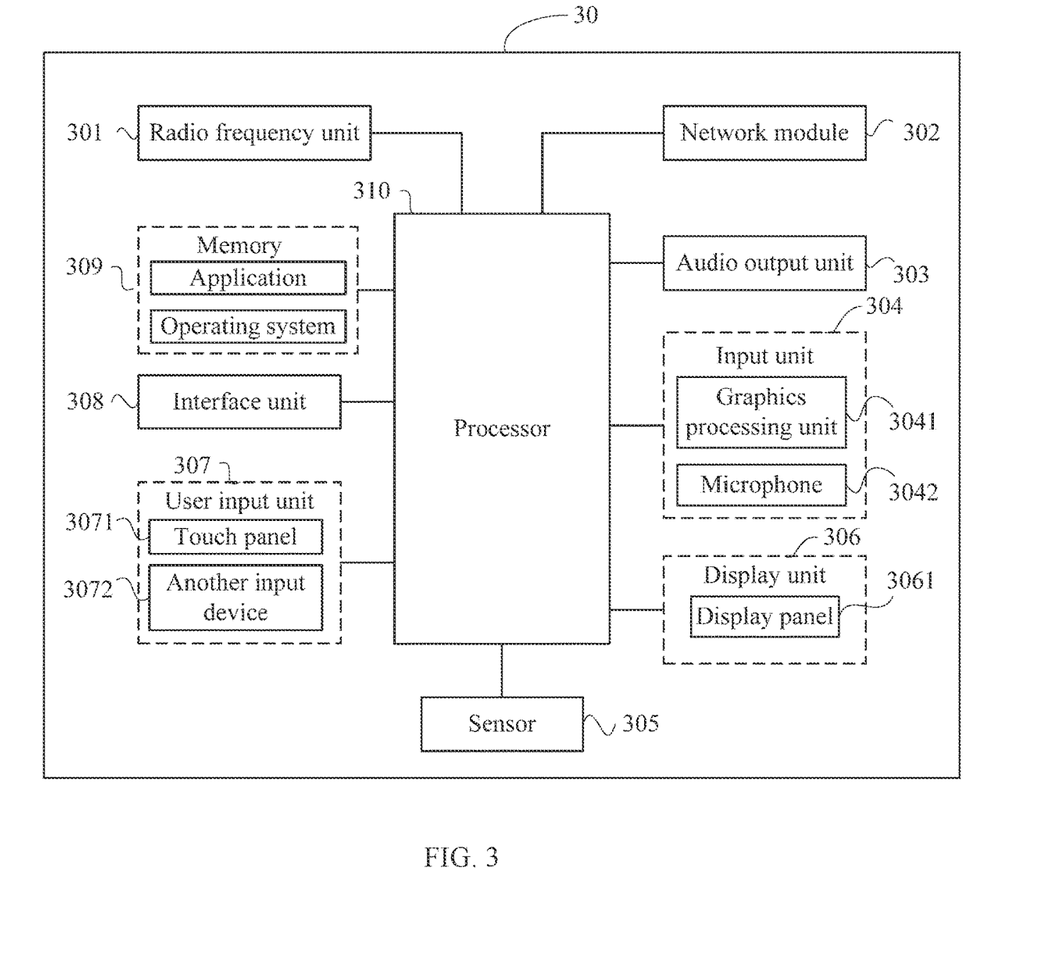
FIG. 3 is a schematic diagram of a structure of an electronic device according to this application.

FIG. 3 is a schematic diagram of a hardware structure of an electronic device for implementing embodiments of this application.

The electronic device 30 includes but is not limited to components such as a radio frequency unit 301, a network module 302, an audio output unit 303, an input unit 304, a sensor 305, a display unit 306, a user input unit 307, an interface unit 308, a memory 309, and a processor 310.

It may be understood by a person skilled in the art that the electronic device 30 may further include a power supply (such as a battery) that supplies power to each component. The power supply may be logically connected to the processor 310 by using a power management system, to implement functions such as charging, discharging, and power consumption management by using the power management system. A structure of the electronic device shown in FIG. 3 does not constitute a limitation on the electronic device, and may include more or fewer parts than those shown in the figure, or synthesize some components, or have different part arrangements. Details are not described herein again.

In this embodiment of this application, the user input unit 307 includes a display interface in this embodiment of this application.

The processor 310 is configured to: acquire a first starry sky image; determine a first planet in the first starry sky image according to a geographical location of the electronic device and/or recognition of the first starry sky image; acquire magnitude brightness corresponding to the first planet; and adjust brightness of the first planet in the first starry sky image according to the target time and the magnitude brightness; where the target time is time at which the first starry sky image is acquired.

According to the electronic device provided in this embodiment of this application, when a first starry sky image is acquired, a first planet in the first starry sky image is first determined according to a geographical location of an electronic device and/or recognition of the first starry sky image; and then, magnitude brightness corresponding to the first planet is acquired; and then, the brightness of the first planet in the first starry sky image is adjusted according to target time at which the first starry sky image is acquired and the magnitude brightness. In the foregoing shooting manner, the electronic device automatically adjusts, according to the acquired magnitude brightness of each first planet in shot stars and shooting time, the brightness of each first planet in the acquired first starry sky image, to simulate the brightness visual performance of each planet, so that brightness of each planet in the shot starry sky image can be real, clear, and delicate.

In an implementation, the electronic device includes a micro gimbal and a camera, and the camera is disposed on the micro gimbal. The processor 310 is further configured to: acquire a target rotation angle according to target duration before the first starry sky image is acquired, where the target rotation angle is an angle of rotation of the earth within the target duration, and the target duration is duration from receiving of a shooting input by the electronic device to imaging; and is configured to: receive a first input of a user by using the user input unit 307; and in response to the first input, rotate the micro gimbal according to the target rotation angle and acquire the first starry sky image.

In an implementation, the processor 310 is further configured to: before the first starry sky image is acquired, acquire N starry sky images, where backgrounds of the N starry sky images are the same, and the N starry sky images are acquired by performing shooting at an interval of preset time; and is configured to: acquire a planet image of each planet image in the N starry sky images and coordinate information of each planet image in a corresponding starry sky image, to acquire N planet images and corresponding N pieces of coordinate information; and synthesize the corresponding N planet images into a target background to acquire the first starry sky image according to the N pieces of coordinate information, where the target background is a background of a target starry sky image in the N starry sky images.

In an implementation, there are M first starry sky images, focuses of the M starry sky images are the same, and the M starry sky images are images shot by the electronic device after moving a preset distance at intervals. The processor 310 is further configured to: after the brightness of the first planet in the first starry sky image is adjusted according to the target time and the magnitude brightness, control the display unit 306 to play the M starry sky images in a preset sequence within preset duration, where the preset sequence is a sequence of starry sky images shot by the electronic device after moving a preset distance.

In an implementation, the processor 310 is further configured to: after the step of determining a first planet in the first starry sky image according to a geographical location of the electronic device and/or recognition of the first starry sky image, receive a second input for the first planet by using a user input unit 307; and in response to the second input, control the display unit 306 to display planet information corresponding to the first planet.

An embodiment of this application further provides a readable storage medium. A program or an instruction is stored in the readable storage medium. When the program or the instruction is executed by a processor, processes of the embodiment of the shooting method can be implemented, and a same technical effect can be achieved. To avoid repetition, details are not described herein.

The processor is a processor in the electronic device in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip. The chip includes a processor and a communication interface, the communication interface is coupled to the processor, and the processor is configured to run a program or an instruction to implement processes of the embodiment of the shooting method, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or synthesized. In addition, features described with reference to some examples may be synthesized in other examples.

Aspects of this application are described with reference to a flowchart and/or a block diagram of a method, an apparatus, and a computer program product according to embodiments of this application. It should be understood that each block in the flowchart and/or block diagram and a synthesis of blocks in the flowchart and/or block diagram may be implemented by a program instruction. These program instructions may be provided to a processor of a general-purpose computer, a dedicated computer, or another programmable data processing apparatus to produce a machine, so that these instructions executed by the processor of the computer or another programmable data processing apparatus enable implementation of a function/action specified in one or more blocks of a flowchart and/or block diagram. The processor may be but is not limited to a general purpose processor, a dedicated processor, a special application processor, or a field programmable logic circuit. It may be further understood that each block in the block diagram and/or flowchart and a synthesis of blocks in the block diagram and/or flowchart may be implemented by dedicated hardware that performs a specified function or action, or may be implemented by a synthesis of dedicated hardware and a computer instruction.

According to the descriptions of the foregoing implementations, a person skilled in the art may clearly understand that the foregoing method embodiments may be implemented by using software and a required universal hardware platform, or may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A shooting method, performed by an electronic device comprising a micro gimbal and a camera disposed on the micro gimbal, comprising:
   acquiring a target rotation angle according to a target duration, wherein the target rotation angle is an angle of rotation of the earth within the target duration, and the target duration is a duration from receiving a shooting input by the electronic device to shooting an image by the camera;
   receiving a first input of a user;
   in response to the first input, rotating the micro gimbal according to the target rotation angle by the micro gimbal and acquire a first starry sky image by the camera;
   determining a first planet in the first starry sky image according to a geographical location of the electronic device or recognition of the first starry sky image;
   acquiring a magnitude brightness corresponding to the first planet; and
   adjusting a brightness of the first planet in the first starry sky image according to a target time and the magnitude brightness,
   wherein the target time is a time at which the first starry sky image is acquired.

2. The shooting method according to claim 1, wherein in response to the first input, rotating the micro gimbal according to the target rotation angle and acquiring the first stan-y sky image by the camera, comprises:
   after the target duration is reached, rotating the micro gimbal according to the target rotation angle by the micro gimbal and shooting a first image by the camera;
   repeating the rotating and shooting steps, obtaining a plurality of first images; and
   aligning and synthesizing the plurality of first images into one target image to acquire the first starry sky image.

3. The shooting method according to claim 1, wherein before acquiring the first starry sky image, the method further comprises:
   acquiring N starry sky images, wherein backgrounds of the N starry sky images are the same, and the N starry sky images are acquired by performing shooting at preset time intervals,
   wherein acquiring the first starry sky image comprises:
   acquiring a planet image of each starry sky image in the N starry sky images and coordinate information of each planet image in a corresponding starry sky image, to acquire N planet images and corresponding N pieces of coordinate information; and
   synthesizing the corresponding N planet images into a target background to acquire the first starry sky image according to the N pieces of coordinate information, wherein the target background is a background of a target starry sky image in the N starry sky images.

4. The shooting method according to claim 1, further comprising acquiring M first starry sky images, wherein focuses of the M starry sky images are the same, and the M starry sky images are images acquired by the electronic device moving a preset distance at intervals; and
   after adjusting the brightness of the first planet in the first starry sky image according to the target time and the magnitude brightness, the method further comprises:
   playing the M starry sky images in a preset sequence within a preset duration, wherein the preset sequence is a sequence of starry sky images shot by the electronic device after moving a preset distance.

5. The shooting method according to claim 1, wherein after determining the first planet in the first starry sky image according to the geographical location of the electronic device or recognition of the first starry sky image, the method further comprises:
   receiving a second input for the first planet; and
   displaying, in response to the second input, planet information corresponding to the first planet.

6. An electronic device, comprising:
a micro gimbal;
a camera disposed on the micro gimbal;
a memory storing a computer program; and
a processor coupled to the memory and configured to execute the computer program to perform operations comprising:
acquiring a target rotation angle according to a target duration wherein the target rotation angle is an angle of rotation of the earth within the target duration and the target duration is a duration from receiving a shooting input by the electronic device to shooting an image by the camera;
receiving a first input of a user;
in response to the first input, rotating the micro gimbal according to the target rotation angle by the micro gimbal and acquire a first starry sky image by the camera;
determining a first planet in the first starry sky image according to a geographical location of the electronic device or recognition of the first starry sky image;
acquiring a magnitude brightness corresponding to the first planet; and
adjusting a brightness of the first planet in the first starry sky image according to a target time and the magnitude brightness,
wherein the target time is a time at which the first starry sky image is acquired.

7. The electronic device according to claim 6,
wherein in response to the first input, rotating the micro gimbal according to the target rotation angle and acquiring the first starry sky image by the camera, comprises:
after the target duration is reached, rotating to the micro gimbal according to the target rotation angle by the micro gimbal and shooting a first image by the camera;
repeating the rotating and shooting steps, obtaining a plurality of first images; and
aligning and synthesizing the plurality of first images into one target image to acquire the first starry sky image.

8. The electronic device according to claim 6, wherein before acquiring the first starry sky image, the operations further comprise:
acquiring N starry sky images, wherein backgrounds of the N starry sky images are the same, and the N starry sky images are acquired by performing shooting at preset time intervals,
wherein acquiring the first starry sky image comprises:
acquiring a planet image of each starry sky image in the N starry sky images and coordinate information of each planet image in a corresponding starry sky image, to acquire N planet images and corresponding N pieces of coordinate information; and
synthesizing the corresponding N planet images into a target background to acquire the first starry sky image according to the N pieces of coordinate information, wherein the target background is a background of a target starry sky image in the N starry sky images.

9. The electronic device according to claim 6, further comprising acquiring M first starry sky images, wherein focuses of the M starry sky images are the same, and the M starry sky images are images acquired by the electronic device moving a preset distance at intervals; and
after adjusting the brightness of the first planet in the first starry sky image according to the target time and the magnitude brightness, the operations further comprise:
playing the M starry sky images in a preset sequence within a preset duration, wherein the preset sequence is a sequence of starry sky images shot by the electronic device after moving a preset distance.

10. The electronic device according to claim 6, wherein after determining the first planet in the first starry sky image according to the geographical location of the electronic device or recognition of the first starry sky image, the operations further comprise:
receiving a second input for the first planet; and
displaying, in response to the second input, planet information corresponding to the first planet.

11. A non-transitory computer-readable storage medium, storing a computer program, wherein the computer program, when executed by a processor of an electronic device comprising a micro gimbal and a camera disposed on the micro gimbal, causes the processor to perform operations comprising:
acquiring a target rotation angle according to a target duration, wherein the target rotation angle is an angle of rotation of the earth within the target duration, and the target duration is a duration from receiving a shooting input by the electronic device to shooting an image by the camera;
receiving a first input of a user;
in response to the first input, rotating the micro gimbal according to the target rotation angle by the micro gimbal and acquire a first starry sky image by the camera;
determining a first planet in the first starry sky image according to a geographical location of the electronic device or recognition of the first starry sky image;
acquiring a magnitude brightness corresponding to the first planet; and
adjusting a brightness of the first planet in the first starry sky image according to a target time and the magnitude brightness,
wherein the target time is a time at which the first stan-y sky image is acquired.

12. The non-transitory computer-readable storage medium according to claim 11, wherein
in response to the first input, rotating the micro gimbal according to the target rotation angle and acquiring the first starry sky image by the camera, comprises:
after the target duration is reached, rotating the micro gimbal according to the target rotation angle by the micro gimbal and shooting a first image by the camera;
repeating the rotating and shooting steps, obtaining a plurality of first images; and
aligning and synthesizing the plurality of first images into one target image to acquire the first starry sky image.

13. The non-transitory computer-readable storage medium according to claim 11, wherein before acquiring the first starry sky image, the operations further comprise:
acquiring N starry sky images, wherein backgrounds of the N starry sky images are the same, and the N starry sky images are acquired by performing shooting at preset time intervals,
wherein acquiring the first starry sky image comprises:
acquiring a planet image of each starry sky image in the N starry sky images and coordinate information of each planet image in a corresponding starry sky image, to acquire N planet images and corresponding N pieces of coordinate information; and
synthesizing the corresponding N planet images into a target background to acquire the first starry sky image according to the N pieces of coordinate information, wherein the target background is a background of a target starry sky image in the N starry sky images.

14. The non-transitory computer-readable storage medium according to claim 11, wherein the operations further comprises acquiring M first starry sky images, focuses of the M starry sky images are the same, and the M starry sky images are images acquired by the electronic device moving a preset distance at intervals; and after adjusting the brightness of the first planet in the first starry sky image according to the target time and the magnitude brightness, the operations further comprise:

playing the M starry sky images in a preset sequence within a preset duration, wherein the preset sequence is a sequence of starry sky images shot by the electronic device after moving a preset distance.

15. The non-transitory computer-readable storage medium according to claim 11, wherein after determining the first planet in the first starry sky image according to the geographical location of the electronic device or recognition of the first starry sky image, the operations further comprise:

receiving a second input for the first planet; and displaying, in response to the second input, planet information corresponding to the first planet.

* * * * *